Nov. 18, 1969　　　KEIZO SHIMANO　　　3,478,614
MULTISTAGE SPROCKET WHEEL ASSEMBLY FOR A BICYCLE
OF SPEED CHANGE TYPE
Filed Nov. 13, 1967

KEIZO SHIMANO.　　INVENTOR.

BY Wenderoth, Lind &
Ponack. Atty's

United States Patent Office 3,478,614
Patented Nov. 18, 1969

3,478,614
MULTISTAGE SPROCKET WHEEL ASSEMBLY FOR A BICYCLE OF SPEED CHANGE TYPE
Keizo Shimano, Sakai, Japan, assignor to Shimano Kogyo Kabushiki Kaisha, Sakai, Japan
Filed Nov. 13, 1967, Ser. No. 682,036
Claims priority, application Japan, Nov. 17, 1966,
41/106,350, 41/106,351
Int. Cl. F16h *55/30;* B62m *25/00*
U.S. Cl. 74—243                    10 Claims

ABSTRACT OF THE DISCLOSURE

This invention relates to a multistage sprocket wheel assembly consisting of a plurality of sprocket wheels having different numbers of teeth or having different diameters arrange in parallel and mounted on a rear wheel hub of a bicycle for speed change purpose, and it involves an improved arrangement for maintaining the width of the sprocket wheel assembly as small as possible.

---

In a speed change mechanism for a bicycle, comprising a multistage sprocket wheel assembly mounted on a rear wheel hub of the bicycle, the engagement of the driving chain with the sprocket wheel is changed-over from an inner or low speed sprocket wheel to an outer or high speed sprocket wheel, and vice versa, in effecting desired speed change. With respect to such multistage sprocket wheel assembly, the larger the number of unit sprocket wheels used, the longer the whole assembly must be extended outwardly, so that it would be a disadvantage to the driver and liable to spoil his garments. To remove such disadvantages, it has heretofore been proposed to reduce the thickness of each unit and to reduce the interval between two sprocket wheels, and to employ a driving chain having smaller width. However, when such specific chain of smaller width is used, not only would there be a considerable wear thereof, but also it is more expensive. The principal object of the present invention is to overcome the above mentioned disadvantages in the known sprocket wheel assembly.

According to the present invention, the interval between each two adjacent sprocket wheels on the low speed or inner side of the hub is made smaller than the interval between each adjacent two sprocket wheels on the high speed or outermost side. By such measure, the width of the sprocket wheel assembly as a whole has been considerably reduced, and yet the necessity of employing the special driving chain of smaller width has been avoided.

Other objects and advantages of the invention will become apparent from the following description, when taken in conjunction with the accompanying drawings in which.

Figure 2:
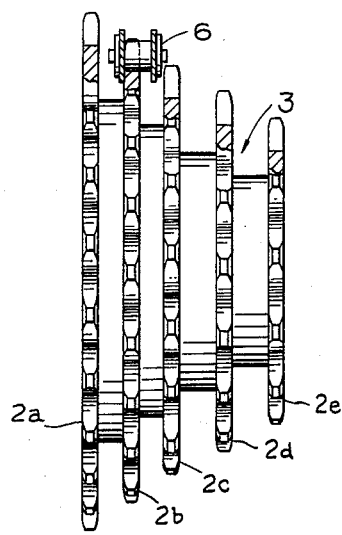
FIGURE 2 is a rear view, partly in section, of the multistage sprocket wheel assembly, showing a driving chain engaging with the inside edge of one of the sprocket wheels which is alloted for low speed transmission.
Figure 3:
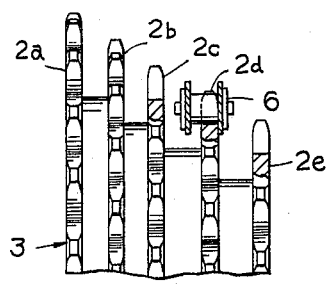
FIGURE 3 is a similar rear view, partly in section, showing a part of the driving chain engaging with the outside edge of one of the sprocket wheels which is alloted for high speed transmission.
Figure 4:
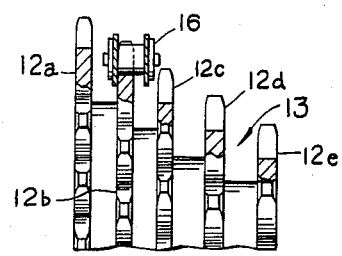
Figure 5:
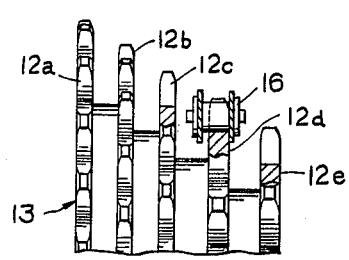
Figure 6:
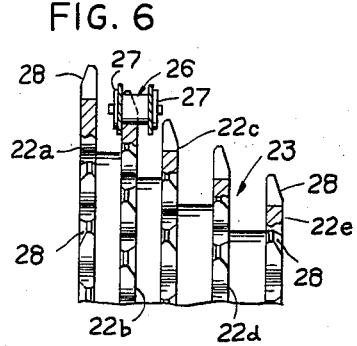
Figure 7:
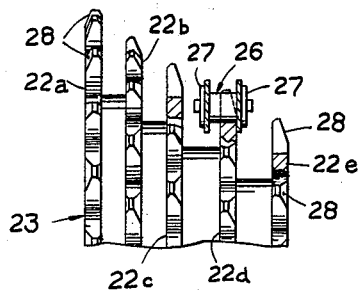

FIGURES 4 and 5 correspond with FIGURES 2 and 3, respectively, and showing a modified embodiment of the invention; and FIGURES 6 and 7 correspond with FIGURES 2 and 3 respectively, and showing another modified embodiment of the invention.

Figure 1:
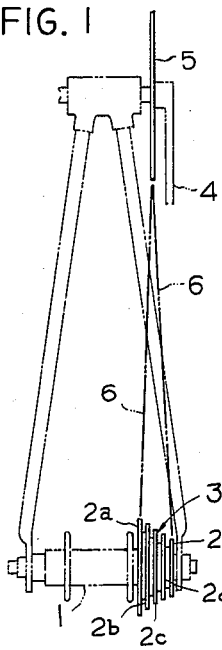
FIGURE 1 is a plan view, partly in section, of a multistage sprocket wheel assembly for a bicycle according to the present invention.

Referring to FIG. 1, the multistage sprocket wheel assembly 3, consisting of a plurality of sprocket wheels 2a, 2b, 2c, 2d and 2e, each having a progressively different number of teeth, is mounted on the righthand end portion of a rear wheel hub 1 of a bicycle, the largest sprocket wheel 2a being arranged in the innermost position and the smallest sprocket wheel 2e being arranged in the outermost position, as shown. A driving chain 6 runs around the multistage sprocket wheel assembly 3 and a driving sprocket wheel 5 having a crank 4. When the chain 6 engages with the sprocket wheel unit 2a or 2b on the low speed side (inner or lefthand side in the drawing), the chain will be deflected inwardly, and when the chain engages with the unit sprocket wheel 2d or 2e on the high speed side (outer or righthand side in the drawing) the chain will be deflected outwardly, as shown in broken line. Observing any tendency of the chain 6 to be in contact with the adjacent sprocket wheel due to such deflection of the chain, it will be seen that with respect to the sprocket wheel on the low speed side, the tendency of the chain coming into the contact with the adjacent sprocket wheel is less than that with respect to the sprocket wheel on this high speed side or on the outer position. This is partly due to the fact that with respect to the low speed side the adjacent sprocket wheel is of smaller diameter.

As a result of the above mentioned observation of the relationship of the driving chain 6 and each sprocket wheel of the sprocket wheel unit assembly 3, according to the present invention, each interval between two low speed sprocket wheels (between 2a and 2b, and between 2b and 2c) is uniform but smaller than that uniform space between any two adjacent high speed sprocket wheels (between 2c and 2d, and between 2d and 2e), as shown in FIG. 2, so that when the chain 6 engages with the low speed sprocket wheel 2b and also when the chain engages with the high speed sprocket wheel 2d, there would be no interference of any sprocket wheel with the driving chain, without substantially increasing the width of the sprocket wheel assembly 3 as a whole.

From the foregoing it will be understood that, according to the present invention, only the intervals between any two low speed sprocket wheels is reduced, while maintaining the usual uniform interval between any two high speed sprocket wheels, thereby making it possible to reduce the width of the sprocket wheel assembly, without the necessity of using a special driving chain having reduced width.

In the modified form of the present invention as shown in FIGS. 4 and 5, the thickness of each low speed sprocket wheel 12a, 12b or 12c is less than the thickness of each high speed sprocket wheel 12d and 12e. When the driving chain 6 engages with the low speed sprocket wheel 12b (FIG. 4) and also when the chain engages with the high speed sprocket wheel 12d (FIG. 5), there would be no interference of the driving chain and the adjacent sprocket wheel.

In another modified embodiment of this invention shown in FIGS. 6 and 7, the peripheral inner edge of the innermost or lowest speed sprocket wheel 22a as well as the peripheral outer edge of the outermost or highest speed sprocket wheel 22e are largely and oppositely beveled, as at 28. Said measure has been taken for the purpose of preventing any disengagement of the driving chain at the time of effecting speed change-over, which is liable to occur especially with respect to the innermost and outermost sprocket wheels, where the deflection of the driving chain is largest.

What I claim is:

1. A bicycle type, change speed, multistage sprocket wheel assembly consisting of five, toothed sprocket wheels on a hub and having progressively different diameters and numbers of teeth, with each sprocket wheel being spaced at a predetermined interval from the next, and wherein the middle of the five sprocket wheels constitutes a separation between a group of generally lower speed, larger diameter sprocket wheels mounted toward the inner side of the hub, and a group of higher speed, lesser diameter sprocket wheels mounted toward the outer side of the hub, said assembly being characterized by the improved spacing between adjacent sprocket wheels whereby the spacing interval between any two adjacent sprocket wheels of the lower speed group is less than the spacing interval between any two adjacent sprocket wheels of the higher speed group.

2. A sprocket wheel assembly as defined in claim 1 wherein at least one of the sprocket wheels of the lower speed group has a greater diameter and greater number of teeth than the middle sprocket wheel.

3. A sprocket wheel assembly as defined in claim 1 wherein at least one of the sprocket wheels of the higher speed group has a lesser number of teeth and is of lesser diameter than the middle sprocket wheel.

4. A sprocket wheel assembly as defined in claim 1 wherein the spacing between individual sprocket wheels of the lower speed group is uniform.

5. A sprocket wheel assembly as defined in claim 1 wherein the spacing between individual sprocket wheels of the higher speed group is uniform.

6. A sprocket wheel assembly as defined in claim 1 wherein the thickness of the individual sprocket wheels of the lower speed group is less than the thickness of those sprocket wheels of the higher speed group.

7. A sprocket wheel assembly as defined in claim 6 wherein the thickness of the sprocket wheels of the lower speed group are generally uniform and the thickness of those sprocket wheels of the higher speed group are generally uniform.

8. A sprocket wheel assembly as defined in claim 7 wherein the middle sprocket wheel is of the same thickness as the other two sprocket wheels of the lower speed group.

9. A sprocket wheel assembly as defined in claim 1 wherein the two outermost sprocket wheels of the group of five have face portions which in the area of the sprocket teeth are oppositely and substantially beveled toward one another.

10. A sprocket wheel assembly as defined in claim 9 wherein the other sprocket wheels intermediate said outermost wheels have one side of their toothed portions similarly beveled and all in a common direction toward the inner side of the hub or assembly.

References Cited

FOREIGN PATENTS 806,096 6/1951 Germany.
888,511 1/1962 Great Britain.

FRED C. MATTERN, JR., Primary Examiner

JAMES A. WONG, Assistant Examiner